United States Patent
Zhang et al.

(10) Patent No.: US 9,521,025 B1
(45) Date of Patent: Dec. 13, 2016

(54) SYSTEM AND METHOD FOR DETECTING TERNARY SEQUENCES

(71) Applicant: Marvell International Ltd., Hamilton (BM)

(72) Inventors: Jin Zhang, Pleasanton, CA (US); Kok-Wui Cheong, Los Altos, CA (US)

(73) Assignee: MARVELL INTERNATIONAL LTD., Hamilton (BM)

( * ) Notice: Subject to any disclaimer, the term of this patent is extended or adjusted under 35 U.S.C. 154(b) by 6 days.

(21) Appl. No.: 14/730,479

(22) Filed: Jun. 4, 2015

Related U.S. Application Data

(60) Provisional application No. 62/008,325, filed on Jun. 5, 2014.

(51) Int. Cl.
 *H04B 10/00* (2013.01)
 *H04L 27/26* (2006.01)
 *H04B 10/27* (2013.01)
 *H04B 10/2575* (2013.01)

(52) U.S. Cl.
 CPC ....... *H04L 27/2647* (2013.01); *H04B 10/2575* (2013.01); *H04B 10/27* (2013.01)

(58) Field of Classification Search
 USPC ................................................ 398/202–214
 See application file for complete search history.

(56) References Cited

U.S. PATENT DOCUMENTS

| | | | | |
|---|---|---|---|---|
| 7,139,320 B1* | 11/2006 | Singh | .................... | H04L 5/0048 375/260 |
| 7,333,528 B1* | 2/2008 | Miao | .................... | H04B 1/7163 375/130 |
| 7,450,654 B2* | 11/2008 | Singh | .................... | H04L 5/0048 370/500 |
| 7,542,516 B2* | 6/2009 | Pirooz | .................. | H04B 1/7183 327/1 |
| 8,081,690 B2* | 12/2011 | Ma | .................... | H04L 25/03006 375/259 |
| 8,280,420 B2* | 10/2012 | Sun | ..................... | H04L 27/2623 375/296 |
| 8,411,661 B2* | 4/2013 | Lipka | .................... | H04L 5/0007 370/344 |
| 2006/0291578 A1* | 12/2006 | Singh | .................... | H04L 5/0048 375/260 |
| 2009/0129490 A1* | 5/2009 | Siaud | .................... | H04L 1/0071 375/260 |
| 2009/0247172 A1* | 10/2009 | Palanki | ................ | H04J 11/0069 455/447 |

(Continued)

*Primary Examiner* — Agustin Bello

(57) ABSTRACT

Systems and methods for detection of a ternary sequence are provided. An example apparatus includes a receiver configured to receive an OFDM signal comprising a plurality of OFDM Resource Elements (REs). A processor is coupled to the receiver and is configured to detect a presence of a known ternary sequence in the received OFDM signal. The processor is configured to detect the ternary sequence by determining a correlation between a first set of the OFDM REs and a first set of symbols of the ternary sequence. A power of each RE of a second set of the OFDM REs is determined. A sum of the powers is determined. A detection value is based on the correlation and the sum. The ternary sequence is determined to be present in the signal based on a comparison of the detection value to a threshold.

21 Claims, 9 Drawing Sheets

(56) References Cited

U.S. PATENT DOCUMENTS

| | | | | |
|---|---|---|---|---|
| 2011/0286535 A1* | 11/2011 | Ko | ................. | H04L 1/0041 |
| | | | | 375/259 |
| 2013/0188757 A1* | 7/2013 | Kalyani | ............. | H04L 5/0048 |
| | | | | 375/340 |
| 2014/0169488 A1* | 6/2014 | Varanese | ............ | H04L 27/2613 |
| | | | | 375/260 |
| 2014/0255029 A1* | 9/2014 | Varanese | ............ | H04L 27/2626 |
| | | | | 398/66 |
| 2014/0328589 A1* | 11/2014 | Rahman | ............ | H04L 27/2613 |
| | | | | 398/38 |
| 2015/0078765 A1* | 3/2015 | Ishihara | .......... | H04B 10/07951 |
| | | | | 398/208 |

* cited by examiner

| 1 | 0 | -1 | 0 | 1 | 0 | -1 | 0 | 1 | 0 | -1 | 0 | 1 | 0 | -1 | 0 |
|---|---|----|---|---|---|----|---|---|---|----|---|---|---|----|---|

FIG. 3C

SYSTEM AND METHOD FOR DETECTING TERNARY SEQUENCES

CROSS-REFERENCE TO RELATED APPLICATIONS

This disclosure claims priority to U.S. Provisional Patent Application No. 62/008,325, filed on Jun. 5, 2014, which is incorporated herein by reference in its entirety.

TECHNICAL FIELD

The technology described in this document relates generally to communication systems and more particularly to systems and methods for detection of ternary sequences in communication systems.

BACKGROUND

A ternary sequence is a sequence defined via a ternary alphabet of −1, 0, and +1. Ternary sequences differ from binary sequences, which are defined using only the values 0 and 1, and the use of ternary sequences may offer advantages over the use of binary sequences (e.g., systems using ternary sequences can hold the same amount of information in less memory, as compared to systems using binary sequences, etc.). Ternary sequences have wide applications in communication systems. For example, in systems utilizing packetized data transfer, ternary sequences may be used as preambles, where a preamble is a portion of a packet that indicates a start of the packet.

SUMMARY

The present disclosure is directed to systems and methods for detection of ternary sequences. An example apparatus includes a receiver configured to receive an Orthogonal Frequency Division Multiplexing (OFDM) signal comprising a plurality of OFDM Resource Elements (REs). The apparatus also includes a processor coupled to the receiver. The processor is configured to detect a presence of a known ternary sequence in the received OFDM signal, where the known ternary sequence is defined via a ternary alphabet of −1, 0, and +1. The processor is configured to detect the known ternary sequence by determining a correlation between (i) a first set of the OFDM REs, and (ii) a first set of symbols of the known ternary sequence. A power of each RE of a second set of the OFDM REs is determined by the processor. A sum of the powers is determined by the processor. A detection value based on the correlation and the sum is determined by the processor. The known ternary sequence is determined to be present in the received OFDM signal based on a comparison of the detection value to a predetermined threshold.

In another example, an apparatus includes a receiver configured to receive an OFDM signal comprising a plurality of OFDM REs. The apparatus also includes a processor coupled to the receiver. The processor is configured to detect a presence of a known ternary sequence in the received OFDM signal, where the known ternary sequence is defined via a ternary alphabet of −1, 0, and +1. The processor is configured to detect the known ternary sequence by determining a correlation between (i) a first set of the OFDM REs, and (ii) a first set of symbols of the known ternary sequence, the first set of symbols having values of −1 or +1, and the first set of the OFDM REs having time-frequency slot positions that correspond to positions of symbols in the known ternary sequence. An absolute value of each RE of a second set of the OFDM REs is determined by the processor, the second set of the OFDM REs having time-frequency slot positions that correspond to positions of symbols in the known ternary sequence having a value of 0. Each of the absolute values is squared, and a sum of the squared absolute values is determined by the processor. The correlation is scaled by a factor of two by the processor. The scaled correlation and the sum are combined to determine a detection value. The known ternary sequence is determined to be present in the received OFDM signal based on a determination that the detection value is greater than or equal to a predetermined threshold.

In another example, in a method for detecting a ternary sequence, an OFDM signal comprising a plurality of OFDM REs is received. A presence of a known ternary sequence in the received OFDM signal is detected, where the known ternary sequence is defined via a ternary alphabet of −1, 0, and +1. Detecting the presence of the known ternary sequence in the received OFDM signal includes determining a correlation between (i) a first set of the OFDM REs, and (ii) a first set of symbols of the known ternary sequence. The detecting also includes determining a power of each RE of a second set of the OFDM REs. The detecting further includes determining a sum of the powers. A detection value is determined based on the correlation and the sum. The known ternary sequence is determined to be present in the received OFDM signal based on a comparison of the detection value to a predetermined threshold.

BRIEF DESCRIPTION OF THE FIGURES

FIG. 3C depicts a one-dimensional ternary sequence.

Like reference symbols in the various figures indicate like elements.

DETAILED DESCRIPTION

Figure 1:
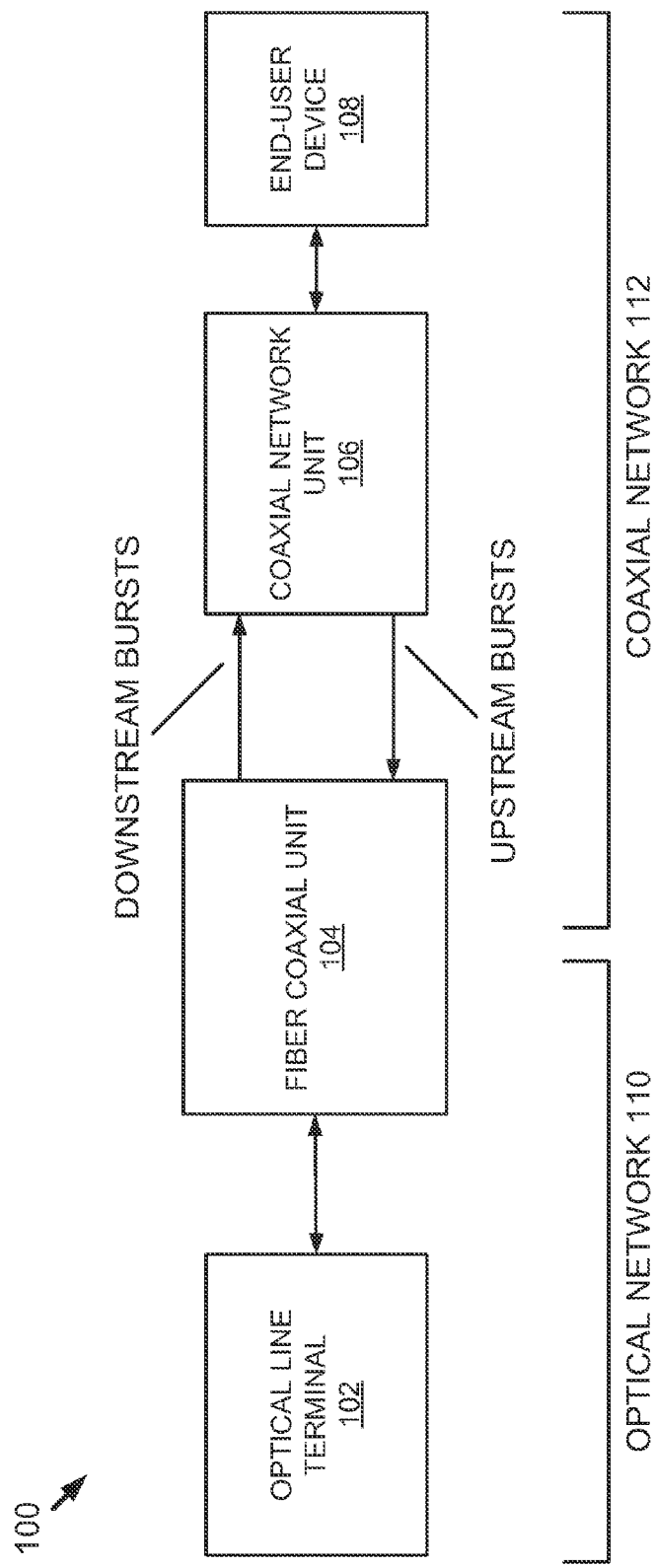
FIG. 1 is a block diagram of an embodiment of an optical-coaxial network comprising an optical portion and a coaxial portion.

FIG. 1 is a block diagram of an embodiment of an optical-coaxial network 100 comprising an optical portion 110 and a coaxial (electrical) portion 112. The optical-coaxial network 100 is an example of a hybrid access network, where such hybrid access networks combine optical networks with coaxial networks. In an example, the optical-coaxial network 100 is an Ethernet Passive Optical Network over Coax (EPoC) network that utilizes Ethernet over Coax (EoC) technology to enable Ethernet frames to be transmitted over the coaxial portion 112. The optical portion 110 of the network 100 is a passive optical network (PON) or active optical network, in examples. In the optical portion 110, an Optical Line Terminal (OLT) 102 connects the network 100 to an external network (e.g. the Internet, etc.).

In the coaxial portion 112 of the network, a Coaxial Network Unit (CNU) 106 is coupled to one or more end-user devices 108 (e.g., laptop computers, tablet computers, smartphones, etc.). A Fiber Coaxial Unit (FCU) 104 functions as an interface between the optical and coaxial portions 110, 112 of the network 100. Communication between the FCU 104 and the CNU 106 utilizes orthogonal frequency division multiplexing (OFDM) transmission, in examples. In such examples, the FCU 104 employs OFDM transmission at a physical layer to communicate with the CNU 106, and the CNU 106 likewise employs OFDM transmission at the physical layer to communicate with the FCU 104. In examples, the electrical portion 112 utilizes passive electrical components (e.g., electrical cables, couplers, splitters, distributors, and/or other equipment) or active electrical components (e.g., amplifiers, etc.) to transmit data between the FCU 104 and the CNU 106.

Disclosed herein are systems and methods for detecting ternary sequences in communication systems. A ternary sequence is a sequence defined via a ternary alphabet of −1, 0, and +1. In an example, ternary sequences are employed as burst marker sequences, where a burst marker sequence indicates a start of a data burst in a signal (e.g., an OFDM signal) or indicates an end of a data burst in a signal. For example, in the network 100 of FIG. 1, an upstream data frame is transmitted from the CNU 106 to the FCU 104, with the upstream data frame including multiple data bursts. Likewise, in the network 100, a downstream data frame is transmitted from the FCU 104 to the CNU 106, with the downstream data frame including multiple data bursts. In order to differentiate one data burst from another, a transmitter (e.g., the FCU 104 or the CNU 106, depending on whether the transmission is an upstream or downstream transmission) inserts burst marker sequences at beginnings or ends of the data bursts. In an embodiment, the burst marker sequences are ternary sequences, with such ternary sequences comprising predetermined patterns drawn from the set $\{-1, 0, 1\}$. The ternary sequences thus act as markers to demarcate the beginnings and/or ends of data bursts. Ternary sequences are distinguishable from additive white Gaussian noise (AWGN) and have different signal features as compared to Quadrature Amplitude Modulation (QAM) signals.

A receiver (e.g., the FCU 104 or the CNU 106, depending on whether the transmission is an upstream or downstream transmission) detects the presence of such ternary sequences in received data based on the receiver's knowledge of known burst marker sequences. As disclosed in further detail below, the receiver detects a presence of a known ternary sequence in a received signal by (i) correlating first portions of the received signal with portions of the known ternary sequence, and (ii) determining power values (e.g., energy values) of second portions of the received signal and determining a sum of the power values. The disclosed systems and methods of detecting ternary sequences offer better performance in both Additive White Gaussian Noise and co-channel interference, as compared to conventional approaches for detecting ternary sequences. The abovementioned step (i) can effectively detect the sequence within AWGN, while the second step (ii) exhibits superior performance in combating co-channel interference, namely the similar modulated EPoC signal originated from other CNUs. The two-step detector thus has better performance than conventional single-step detectors.

With reference again to FIG. 1, the OLT 102 comprises an optical transmitter and an optical receiver configured to communicate with the CNUs 106 via the FCU 104, in an example. The OLT 102 acts as an intermediary between portions of the network 100 (e.g., FCU 104 and CNU 106) and an external network, such as the Internet. The OLT 102 (i) forwards data received from the external network to the FCU 104, and (ii) forwards data received from the FCU 104 onto the external network.

The FCU 104 is a device configured to (i) forward downstream data signals from the OLT 102 to the CNU 106, and (ii) forward upstream data signals from the CNU 106 to the OLT 102. In some embodiments, the downstream and upstream signals are transmitted using OFDM. For example, the downstream and upstream signals are orthogonal frequency division multiplexing access (OFDMA) signals, in an embodiment. The FCU 104 includes, in an example, a coaxial line terminal (CLT), which is used to couple the FCU 104 to one or more CNUs 106 via coaxial links. In an example, the FCU 104 includes an electrical transmitter configured to send electrical signals to the CNU 106 and an electrical receiver configured to receive electrical signals from the CNU 106. The FCU 104 also converts the downstream and upstream data as necessary to transfer the data between the optical portion 110 and the coaxial portion 112, in an embodiment.

The CNU 106 is a device configured to act as an intermediary between the FCU 104 and the end-user device 108. For instance, the CNU 106 (i) forwards data received from the FCU 104 to the end-user device 108, and (ii) forwards data from the end-user device 108 to the FCU 104. In an example, the CNU 106 includes an electrical transmitter configured to send electrical signals to the FCU 104 and the end-user device 108 and an electrical receiver configured to receive electrical signals from the FCU 104 and the end-user device 108. The one or more end-user devices 108 include desktop computers, laptop computers, tablet computers, smartphones, and similar other devices.

As noted above, transmission in the coaxial portion 112 of the network 100 between the CNU 106 and the FCU 104 utilizes OFDM transmission (e.g., via OFDMA signals), in an example. In an OFDM system, data is transmitted via OFDM frames that span across a time domain and a frequency domain. An OFDM frame comprises a plurality of OFDM symbols in the time domain, and each OFDM symbol comprises a plurality of OFDM sub-carriers in the frequency domain. In some embodiments, frames (or portions thereof) are constructed from resource blocks. Frames for upstream transmissions from the CNU 106 to the FCU 104 are constructed from resource blocks, in an example OFDMA system. Similarly, frames for downstream transmissions from the FCU 104 to the CNU 106 are constructed from resource blocks, in the example OFDMA system.

The smallest unit for OFDM transmission is one time-frequency slot (e.g., one OFDM sub-carrier for a duration of an OFDM symbol), which is referred to as an OFDM Resource Element (RE). A resource block comprises a matrix (e.g. a one-dimensional or two dimensional matrix) of OFDM REs. In transmitting upstream data to the FCU 104, the CNU 106 transmits data packets using OFDM data bursts by mapping data bits (e.g., according to some modulation scheme) of the data packets onto a plurality of OFDM REs. Likewise, in transmitting downstream data to the CNU 106, the FCU 104 transmits data packets using OFDM data bursts by mapping data bits of the data packets onto a plurality of OFDM REs. As described below, ternary sequences are utilized as markers to demarcate the beginnings and/or ends of OFDM data bursts, and disclosed herein are systems and methods for detecting the presence of known ternary sequences in signals. Thus, in an example, when the FCU 104 receives an OFDM signal from the CNU 106, the FCU 104 carries out steps described below to detect a presence of a known ternary sequence in the received signal. Likewise, when the CNU 106 receives an OFDM signal from the FCU 104, the CNU 106 carries out steps described below to detect a presence of a known ternary sequence in the received signal. Although systems and methods are described herein in the context of an OFDM transmission system, it should be appreciated that the described approaches are also used to detect a presence of ternary sequences in communication systems that do not use OFDM transmission.

Figure 2:
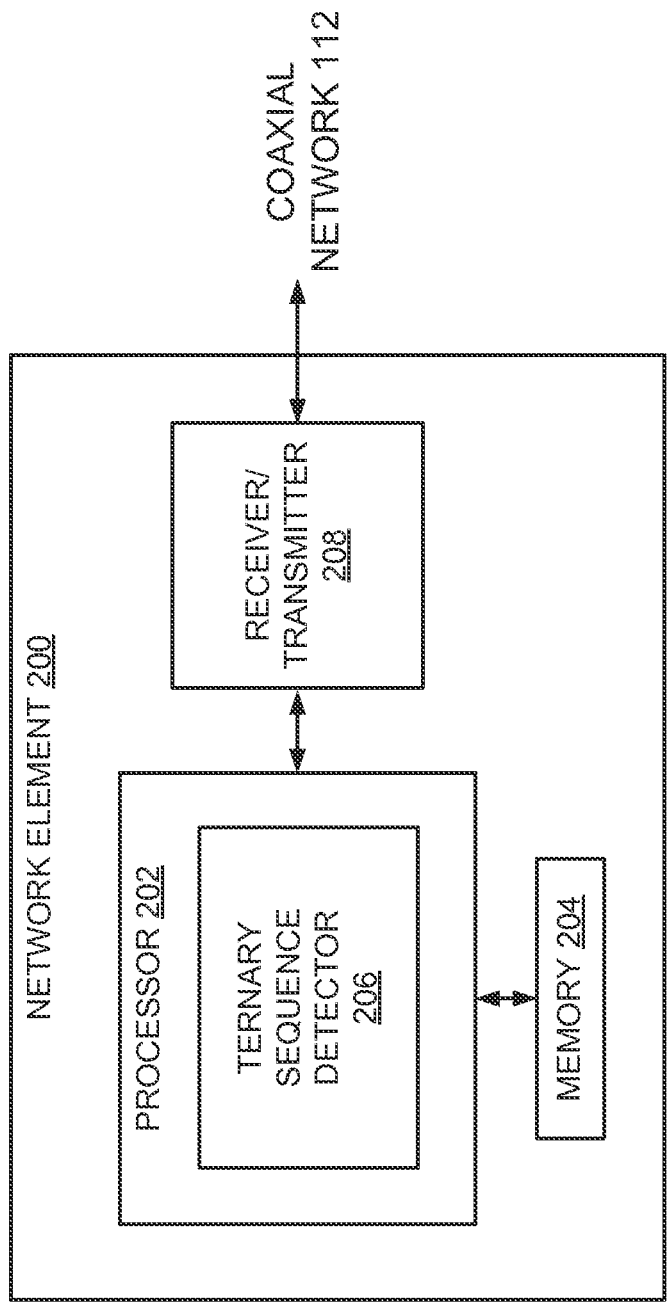
FIG. 2 is a block diagram of a network element.

FIG. 2 is a block diagram of a network element 200. The network element 200 comprises a portion of the FCU 104 or CNU 106, in an example. The network element 200 includes a transceiver 208, which includes a transmitter, a receiver, or a combination thereof. The transceiver 208 is coupled to ports of the network element 200 for transmitting and/or receiving frames from other network elements via the coaxial network 112. In an example where the network element 200 comprises a portion of the FCU 104, the transceiver 208 transmits frames to the CNU 106 and receives frames from the CNU 106. Similarly, in an example where the network element 200 comprises a portion of the CNU 106, the transceiver 208 transmits frames to the FCU 104 and receives frames from the FCU 104.

A processor 202 is coupled to the transceiver 208 and is used to process received frames. The processor 202 includes one or more single- or multi-core processors, in an example. In an embodiment, the processor 202 also includes one or more memory devices 204, which function as data stores or buffers. The memory devices 204 are formed on a same chip as the processor 202 in some examples. In other examples, the memory devices 204 are formed on a chip that is separate from and coupled to a chip on which the processor 202 is formed. The processor 202 is implemented as a general purpose, programmable processor, in an example. In other examples, the processor 202 comprises one or more application-specific integrated circuits (ASICs) or digital signal processors (DSPs). The processor 202 includes a ternary sequence detector 206 configured to implement the methods for detection of ternary sequences described below. The ternary sequence detector 206 is implemented in hardware or in a combination of hardware and program code (e.g., software or firmware executed in the processor 202), in various examples. In another example, the ternary sequence detector 206 is implemental entirely in software or firmware. In an embodiment, the ternary sequence detector 206 is implemented as computer-executable instructions stored in the memory devices 204, which are executed by the processor 202. The memory devices 204 comprise volatile memory (e.g., Random Access Memory (RAM)) or non-volatile memory (e.g., Read Only Memory (ROM)), in examples.

Data frames received at the network element 200 via the coaxial network 112 include one or more data bursts. The data bursts are separated by ternary sequences that function as burst marker sequences, in embodiments of the present disclosure. In an example, a known ternary sequence functioning as a burst marker sequence is placed at a beginning of each data burst and/or at an end of each data burst. As such, the known ternary sequence functions as a marker to demarcate a start and/or end of a data burst. As referred to herein, a "known ternary sequence" is a ternary sequence that is known to the network element 200 in advance of the network element's receipt of a signal (e.g., an OFDM signal). Because the ternary sequence is known to the network element 200, the network element 200 can implement the approaches described herein to determine a presence of the ternary sequence in the received signal. In an example, a burst marker sequence comprises a plurality of symbols having values of −1, 0, and 1, that are arranged according to a pre-determined pattern. Each of the symbols is carried in one OFDM RE.

The processor 202 of the network element 200 utilizes a hybrid detection method to detect a presence of a known ternary sequence in a received signal. In a first aspect of the hybrid detection method, the processor 202 determines a correlation between (i) a first set of OFDM REs of the received signal, and (ii) a first set of symbols of the known ternary sequence. In a second part of the hybrid detection method, the processor 202 determines a received power of each RE of a second set of OFDM REs of the received signal. The processor 202 determines a sum of the powers. The processor 202 combines the correlation value and the sum into a detector output value. Further details of the hybrid detection approach are described below.

Figure 3A:
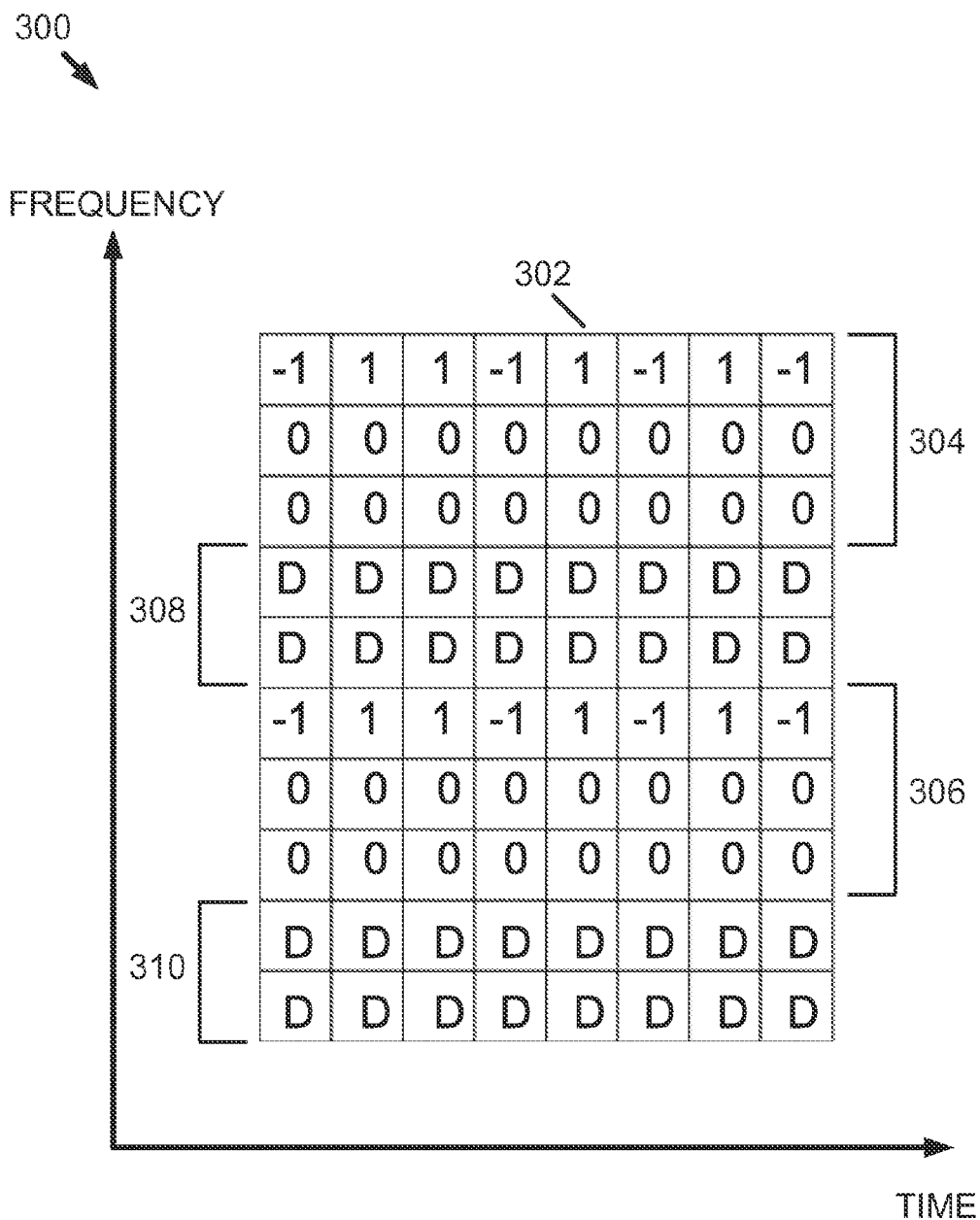
FIGS. 3A and 3B illustrate example burst marker schemes that utilize one or more ternary sequences as burst marker sequences.

FIG. 3A illustrates an example burst marker scheme 300 that utilizes one or more ternary sequences as burst marker sequences. Burst marker schemes similar to that illustrated in FIG. 3A are employed by the FCU 104 or the CNU 106 of FIG. 1. Specifically, in transmitting downstream data bursts to the CNU 106, the FCU 104 inserts burst marker sequences similar to those illustrated in FIG. 3A at boundaries (e.g., at starts or ends) of downstream data bursts. Similarly, in transmitting upstream data bursts to the FCU 104, the CNU 106 inserts burst marker sequences similar to those illustrated in FIG. 3A at boundaries of upstream data bursts.

In FIG. 3A, an x-axis represents time in units of OFDM symbols, and a y-axis represents frequency in units of OFDM sub-carriers. Each time-frequency slot represents an OFDM RE. In FIG. 3A, an OFDM frame 302 includes a first data burst 308, a second data burst 310, a first burst marker sequence 304, and a second burst marker sequence 306. The first burst marker sequence 304 indicates the beginning of the first data burst 308, and the second burst marker sequence 306 indicates the beginning of the second data burst 310. The data bursts 308, 310 comprise a plurality of data symbols, which are illustrated using the notation "D" in the example of FIG. 3A. In an example, the notation "D" stands for Quadrature Amplitude Modulation (QAM) signals. The data bursts 308, 310 span a plurality of contiguous OFDM symbols in time and a plurality of contiguous OFDM sub-carriers in frequency. The burst marker sequences 304, 306 of FIG. 3A comprise symbols having values of −1, 0, and +1, and span across a plurality of contiguous OFDM REs in time and across sub-carrier frequency.

Figure 3B:
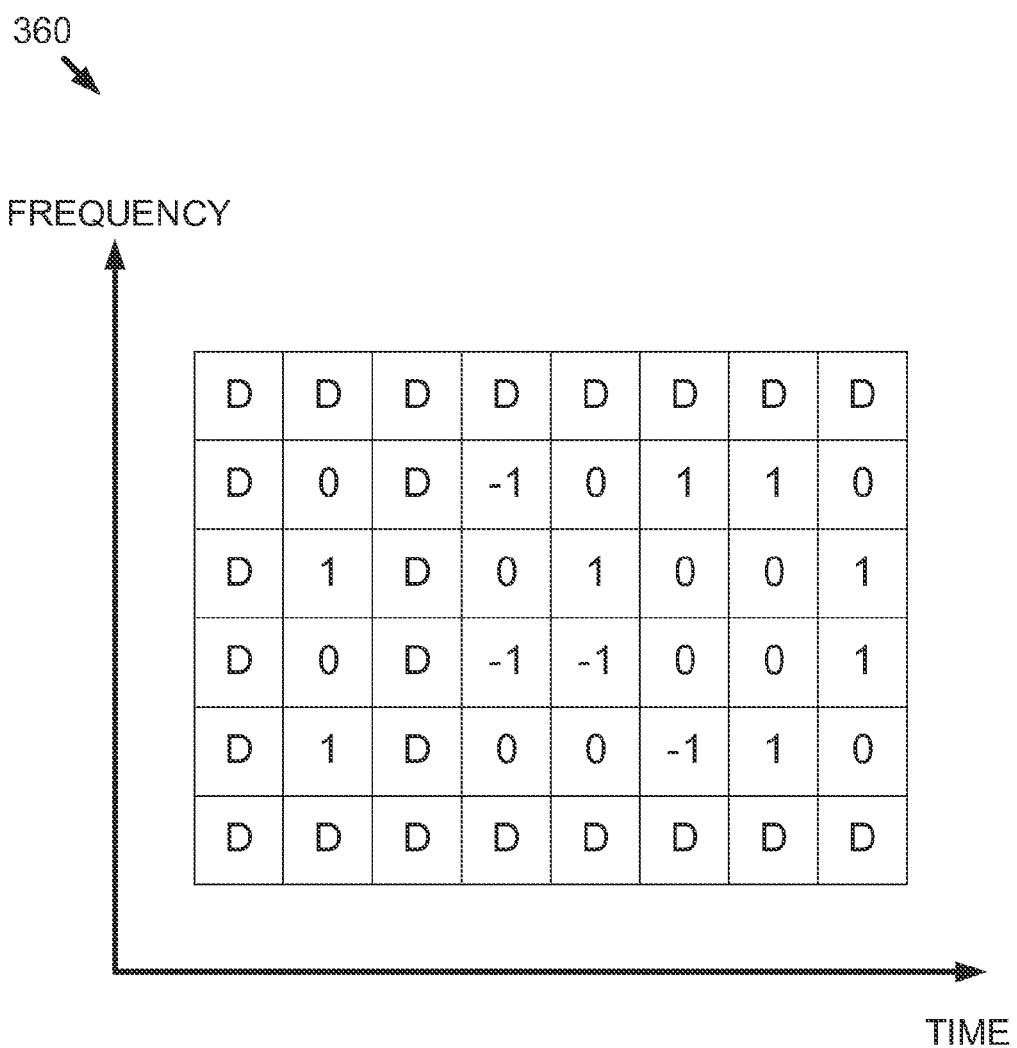
Figure 3C:
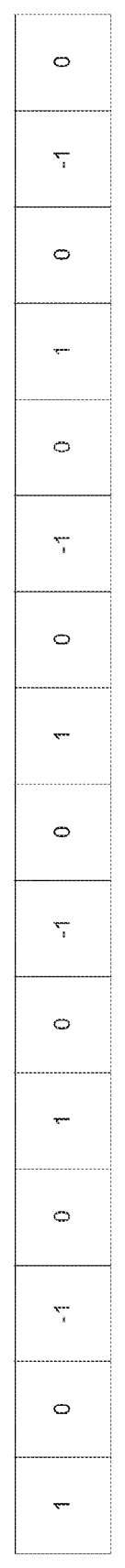

FIG. 3B illustrates another example burst marker scheme 360 that utilizes one or more ternary sequences as burst marker sequences. Burst marker schemes similar to that illustrated in FIG. 3B are employed by the FCU 104 or the CNU 106 of FIG. 1. In FIG. 3B, an x-axis represents time in units of OFDM symbols, and a y-axis represents frequency in units of OFDM sub-carriers. Each time-frequency slot represents an OFDM RE. In FIG. 3B, an OFDM frame includes a burst marker sequence comprising symbols having values of −1, 0, and +1. As shown in the figure, the burst marker sequence is interleaved with a plurality of data symbols, which are illustrated using the notation "D" in the example of FIG. 3B. As noted above, the notation "D"

stands for QAM signals, in some examples. Ternary sequences are also arranged in a one-dimension matrix, in examples. An example one-dimensional ternary sequence is depicted in FIG. 3C.

Figure 4:
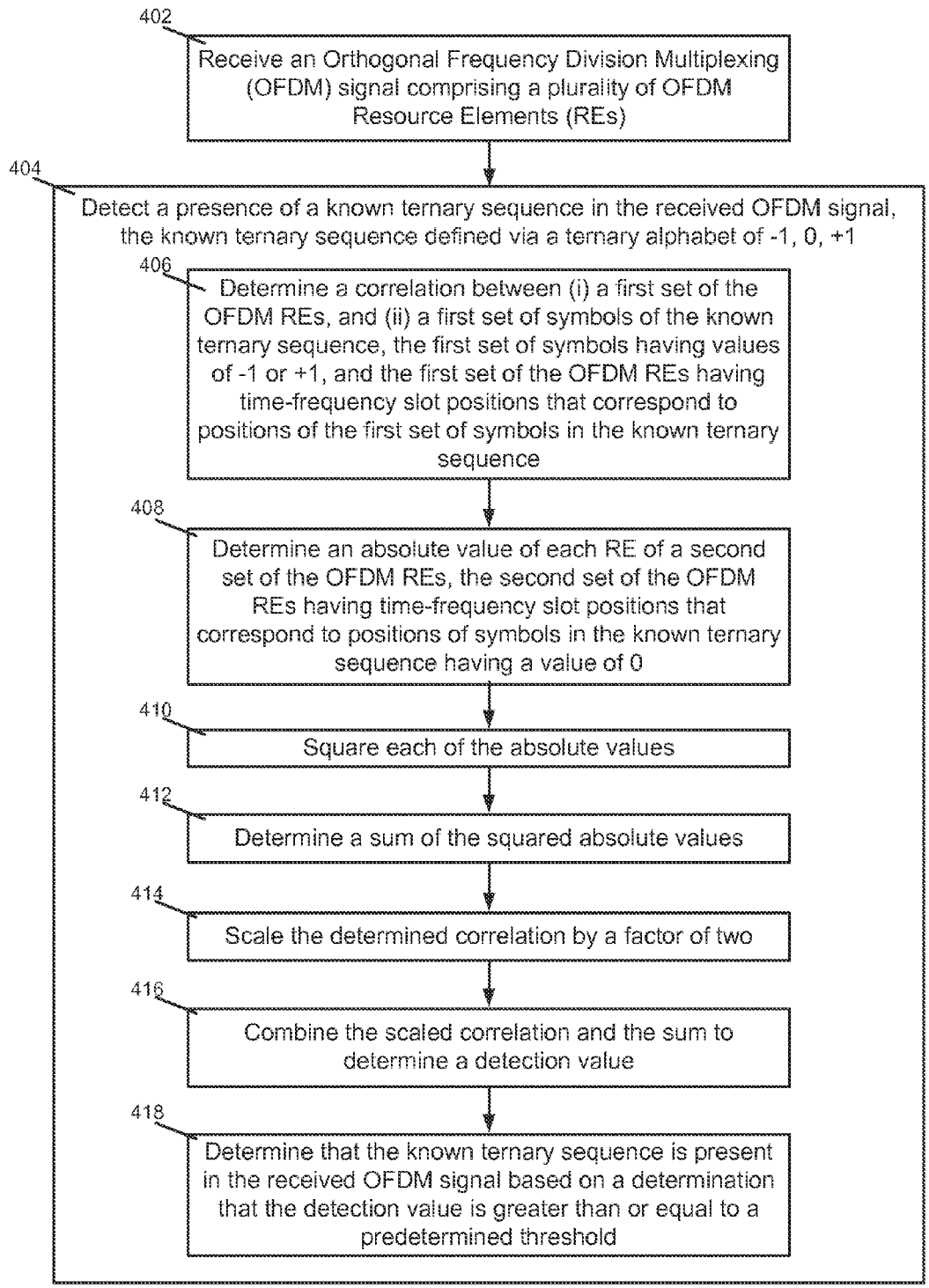
FIG. 4 is a flowchart illustrating an example method for detecting a ternary sequence.

FIG. 4 is a flowchart 400 illustrating an example method for detecting a ternary sequence. The method of FIG. 4 is implemented by an FCU (e.g., the FCU 104 of FIG. 1) or a CNU (e.g., the CNU 106 of FIG. 1), in examples. For example, when the FCU 104 receives a signal containing data bursts, the FCU 104 employs the method of FIG. 4 for detecting a presence of a known ternary sequence in the signal. Conversely, when the CNU 106 receives a signal containing data bursts, the CNU 106 employs the method of FIG. 4 for detecting a presence of a known ternary sequence in the signal. At 402, an OFDM signal containing an OFDM frame is received. The OFDM signal is an upstream signal including an upstream OFDM frame in instances where the method is implemented by the FCU 104, and the OFDM signal is a downstream signal including a downstream OFDM frame in instances where the method is implemented by the CNU 106.

At 404, a presence of a known ternary sequence is detected in the received OFDM signal. Specifically, the detecting of the known ternary sequence includes, at 406, determining a correlation between (i) a first set of the OFDM REs, and (ii) a first set of symbols of the known ternary sequence, where the first set of symbols have values of −1 or +1, and the first set of the OFDM REs have time-frequency slot positions that correspond to positions of the first set of symbols in the known ternary sequence. At 408, an absolute value of each RE of a second set of the OFDM REs is determined, where the second set of the OFDM REs have time-frequency slot positions that correspond to positions of symbols in the known ternary sequence having a value of 0. At 410, each of the absolute values is squared. Steps 408 and 410 collectively comprise determining a received power of each RE of the second set of the OFDM REs (e.g., a power of an RE is equal to the absolute value of the RE, squared). At 412, a sum of the squared absolute values is determined (e.g., a sum of the power values is determined). At 414, the determined correlation is scaled by a factor of two (2), and at 416, the scaled correlation and the sum are combined to determine a detection value. At 418, the ternary sequence is determined to be present in the received OFDM signal based on a determination that the detection value is greater than or equal to a predetermined threshold.

It is noted that the steps of the flowchart 400 need not be performed in the order shown in FIG. 4. In an example, one or more of the steps of the flowchart 400 are performed in parallel (e.g., the determining of the correlation at 406 is performed in parallel with one or more of the steps 408, 410, 412, etc.) or in a different order than is depicted in FIG. 4.

Figure 5:
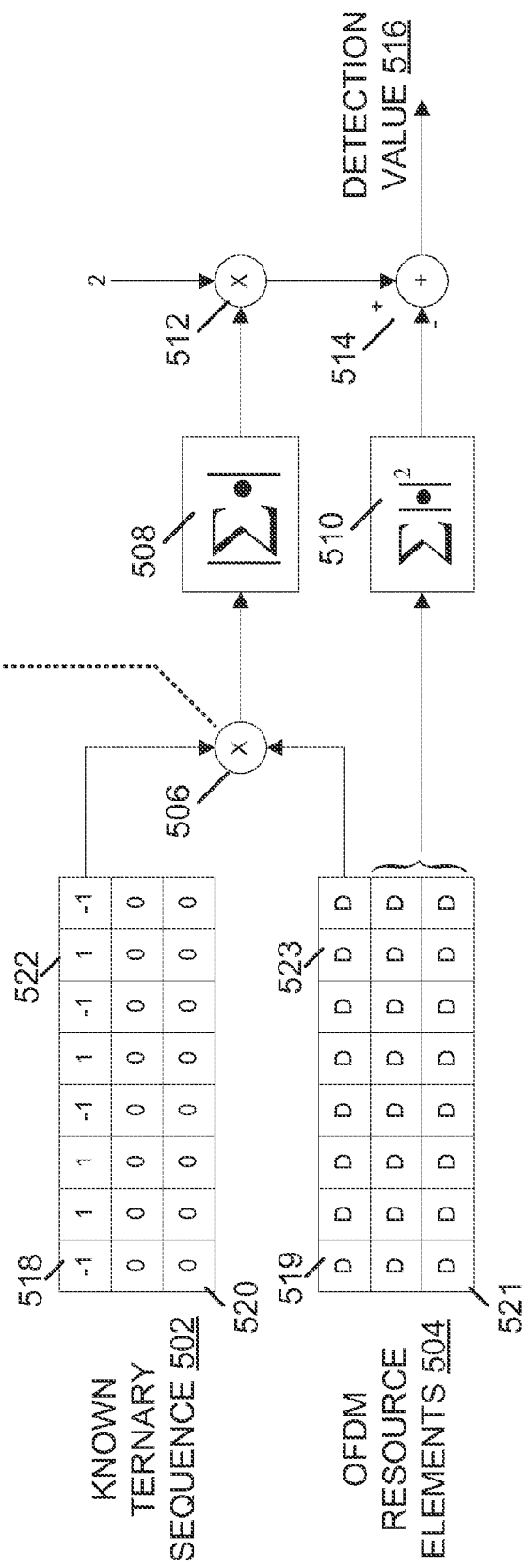
FIG. 5 depicts features of an example approach for determining a presence of a known ternary sequence in a received signal.

To illustrate example steps 406-418 of FIG. 4, reference is made to FIG. 5. This figure depicts (i) OFDM REs 504 that are included in a received OFDM signal, and (ii) a known ternary sequence 502. The OFDM REs 504 comprise a two-dimensional (2D) matrix, where the x-axis represents time in units of OFDM symbols and the y-axis represents frequency in units of OFDM sub-carriers. Each OFDM RE of the OFDM REs 504 has a time-frequency slot position that comprises a frequency interval of one OFDM sub-carrier and a time interval of one OFDM symbol. The known ternary sequence 502 similarly comprises a 2D matrix with a pattern of symbols having values of −1, 0, and +1. These symbols are arranged in various patterns in different examples. Each symbol having a value of −1, 0, and +1 has a position within the known ternary sequence 502.

Reference is made herein to REs having time-frequency slot positions that correspond to positions of symbols in a known ternary sequence. To illustrate this concept, reference is made to FIG. 5. An OFDM RE 519 has a time-frequency slot position that corresponds to a position of a symbol 518 in the known ternary sequence 502. Similarly, an OFDM RE 521 has a time-frequency slot position that corresponds to a position of a symbol 520 in the known ternary sequence 502.

The method of FIG. 4 is utilized to detect a presence of the known ternary sequence 502 in the received OFDM REs 504. The detection of the known ternary sequence 502 includes determining a correlation between a first set of the OFDM REs 504 and a first set of symbols of the known ternary sequence 502, where the first set of symbols have values of −1 or +1, and the first set of the OFDM REs have time-frequency slot positions that correspond to positions of the first set of symbols. Thus, under the approaches described herein, −1 and +1 values of the known ternary sequence 502 are correlated with corresponding OFDM REs of the OFDM REs 504. In the example of FIG. 5, the first set of symbols having values of −1 or +1 are located at positions in the top row of the sequence 502, and thus, the corresponding OFDM REs are those REs having time-frequency slot positions in the top row of the OFDM REs 504. It is noted that the known ternary sequence 502 is only an example and that in other examples, the values of −1, 0, and +1 are arranged differently. For example, although the example sequence 502 of FIG. 5 includes all −1 and +1 values within a single row of the sequence 502, in other examples, the −1 and +1 values have positions within multiple of the rows. Further, a single row includes −1, 0, and +1 values, in other examples. Reference is made to FIGS. 3A-3C, which illustrate other example ternary sequences that may be used.

The determining of the correlation includes a point-by-point multiplication, where each RE of the first set of the OFDM REs 504 (e.g., each RE the first row of the OFDM REs 504) is multiplied by a corresponding symbol of the first set of symbols (e.g., a corresponding symbol in the first row of the known ternary sequence 502) to determine a product. Thus, for example, the OFDM RE 519 is multiplied by the symbol 518 using multiplier 506, with the multiplied RE 519 having a time-frequency slot position that corresponds to a position of the symbol 518 in the known ternary sequence 502. Likewise, for example, the OFDM RE 523 is multiplied by the symbol 522 using the multiplier 506, with the multiplied RE 523 having a time-frequency slot position that corresponds to a position of the symbol 522 in the known ternary sequence 502. After each RE of the first set of the OFDM REs 504 is multiplied with its corresponding symbol of the first set of symbols, the products are summed at 508.

The detection of the ternary sequence 502 further includes determining an absolute value of each RE of a second set of the OFDM REs 504, where the second set of the OFDM REs have time-frequency slot positions that correspond to positions of symbols in the known ternary sequence 502 having a value of 0. In the example of FIG. 5, the symbols of the known ternary sequence 502 having a value of 0 are included in the second and third rows of the sequence 502, and thus, the corresponding OFDM REs are those REs having time-frequency slot positions in the second and third rows of the OFDM REs 504. The absolute value of each of these REs in the second and third rows is taken at 510. Each of the absolute values is squared. The determining of the absolute values and the squaring of the absolute values collectively comprise determining a received power of each RE of the second set of the OFDM REs 504. The squared absolute values (e.g., the powers) are summed at 510. The steps performed at 510 (e.g., steps 408, 410, 412 of the method described above with reference to FIG. 4) thus include determining a sum of powers of signals to be detected corresponding to the "0's" in the known ternary sequence 502.

The correlation determined at 508 is scaled by a factor of two at multiplier 512, and the sum (e.g., the sum of the powers) determined at 510 is combined with the scaled correlation at adder/subtractor 514 to determine a detection value 516. Specifically, in the example of FIG. 5, the sum determined at 510 is subtracted from the scaled correlation to determine the detection value 516. The detection value 516 is thus based on $$O\_P = (2*Corr) - Sum,$$

where O_P is the detection value 516, Corr is the correlation determined at 508, and Sunm is the sum determined at 510. If the received signal to be detected contains unknown phase rotations, a non-coherent reception technique is used, and an absolute value of the correlation result is used. This non-coherent reception technique is illustrated in FIG. 5, which shows that at 506 and 508, (i) each RE of the first set of OFDM REs is multiplied by a corresponding symbol of the first set of symbols to determine a product, (ii) the products are summed, and (iii) an absolute value is taken of the sum of the products. The absolute value of the sum of the products is the correlation value determined at 508 that is scaled at the multiplier 512. It is thus noted that in the example of FIG. 5, the received OFDM signal contains unknown carrier phase rotations.

The detection value 516 is compared to a threshold Th. If the detection value 516 is greater than or equal to Th (i.e., if detection value 516≥Th), then it is determined that the known ternary sequence 502 is present in the received OFDM signal. Conversely, if the detection value 516 is less than Th (i.e., if detection value 516<Th), then it is determined that the known ternary sequence 502 is not present in the received OFDM signal. In an example, the detection value 516 is relatively low when the known ternary sequence 502 is not present in the OFDM signal, and the detection value 516 is relatively high when the known ternary sequence is present in the OFDM signal. In an example, the threshold Th is selected at a level that provides a compromise between a false detection rate (e.g., false detection of an invalid burst marker sequence) and a missed detection rate (e.g., missed detection of a valid burst marker sequence).

Figure 6:
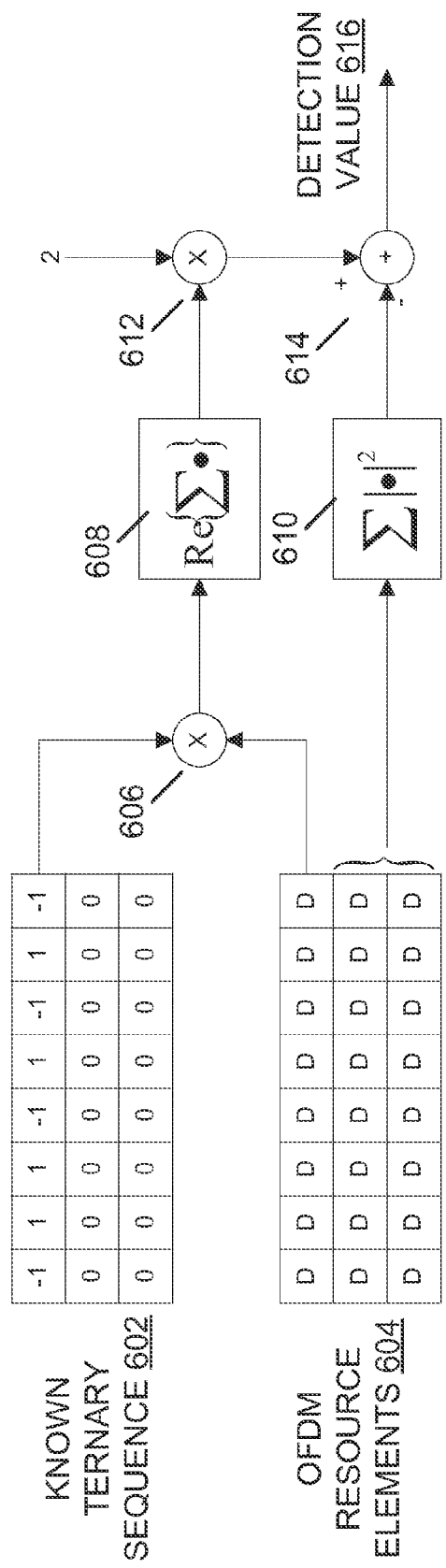
FIG. 6 depicts features of another example approach for determining a presence of a known ternary sequence in a received signal.

As explained above, in the example of FIG. 5, the received OFDM signal contains unknown carrier phase rotations, and thus, the non-coherent reception technique is used (e.g., an absolute value of the correlation result is taken at 508). By contrast, if the received OFDM signal does not contain unknown carrier phase rotations, the detection technique illustrated in FIG. 6 is utilized. As illustrated in this figure, the "+/−1's" in a known ternary sequence 602 are correlated with corresponding REs of OFDM REs 604. The correlation procedure utilizes the multiplier 606 and includes (i) multiplying each RE of the first row of the OFDM REs 604 by a corresponding +/−1 symbol of the known ternary sequence 602 to determine a product, and (ii) summing the products at 608. Because the received OFDM signal does not contain unknown phase rotations, a coherent reception technique is used, and a real number portion of the sum of products is determined at 608. It is thus noted that the absolute value operation performed at 508 in FIG. 5 is replaced by the operation of obtaining real values at 608 in FIG. 6, in accordance with the coherent reception technique.

In FIG. 6, determining whether the known ternary sequence 602 is present in the received signal further includes determining an absolute value of each RE of the second and third rows of the OFDM REs 604, i.e., the REs with frequency-time slot positions that correspond to positions of "0's" in the known ternary sequence 602. The absolute value of each of these REs is taken at 610. Further, each of the absolute values is squared to determine a power for each of the REs in the second and third rows of the OFDM REs 604. The squared absolute values (e.g., the powers) are summed at 610. The steps performed at 610 thus include determining a sum of powers of signals to be detected corresponding to the "0's" in the known ternary sequence 602. The correlation determined at 608 is scaled by a factor of two at multiplier 612, and the sum determined at 610 is subtracted from the scaled correlation at adder/subtractor 614 to determine the coherent detection value 616. The coherent detection value 616 is compared with a threshold Th. If the coherent detection value 616 is greater than or equal to Th, then it is determined that the known ternary sequence 602 is present in the received OFDM signal. Conversely, if the detection value 616 is less than Th, then it is determined that the known ternary sequence 602 is not present in the received OFDM signal.

Although the above examples are illustrated in the context of an OFDM transmission system (e.g., utilizing OFDM signals comprising multiple OFDM Resource Elements), it is noted that the approaches described herein for detecting ternary sequences are applicable to other types of communication systems. In other types of communication systems, the approaches described herein include, generally, (i) correlating +/−1's of a known ternary sequence with corresponding signals (or portions thereof) to be detected, (ii) summing received powers of signals to be detected corresponding to the 0's in the known ternary sequence, (iii) combining the correlator output and the sum of the powers to determine a detector output value (e.g., scaling the correlator output by a factor of two and subtracting the sum of the powers from the scaled correlator output), and (iv) comparing the detector output value to a threshold. If the signals to be detected contain unknown phase rotations, non-coherent reception is used by taking the absolute value of the correlation result. If the signals to be detected do not contain unknown carrier phase rotations, coherent reception is used by obtaining a real number portion of the correlation result, as illustrated above with reference to FIG. 6.

Figure 7:
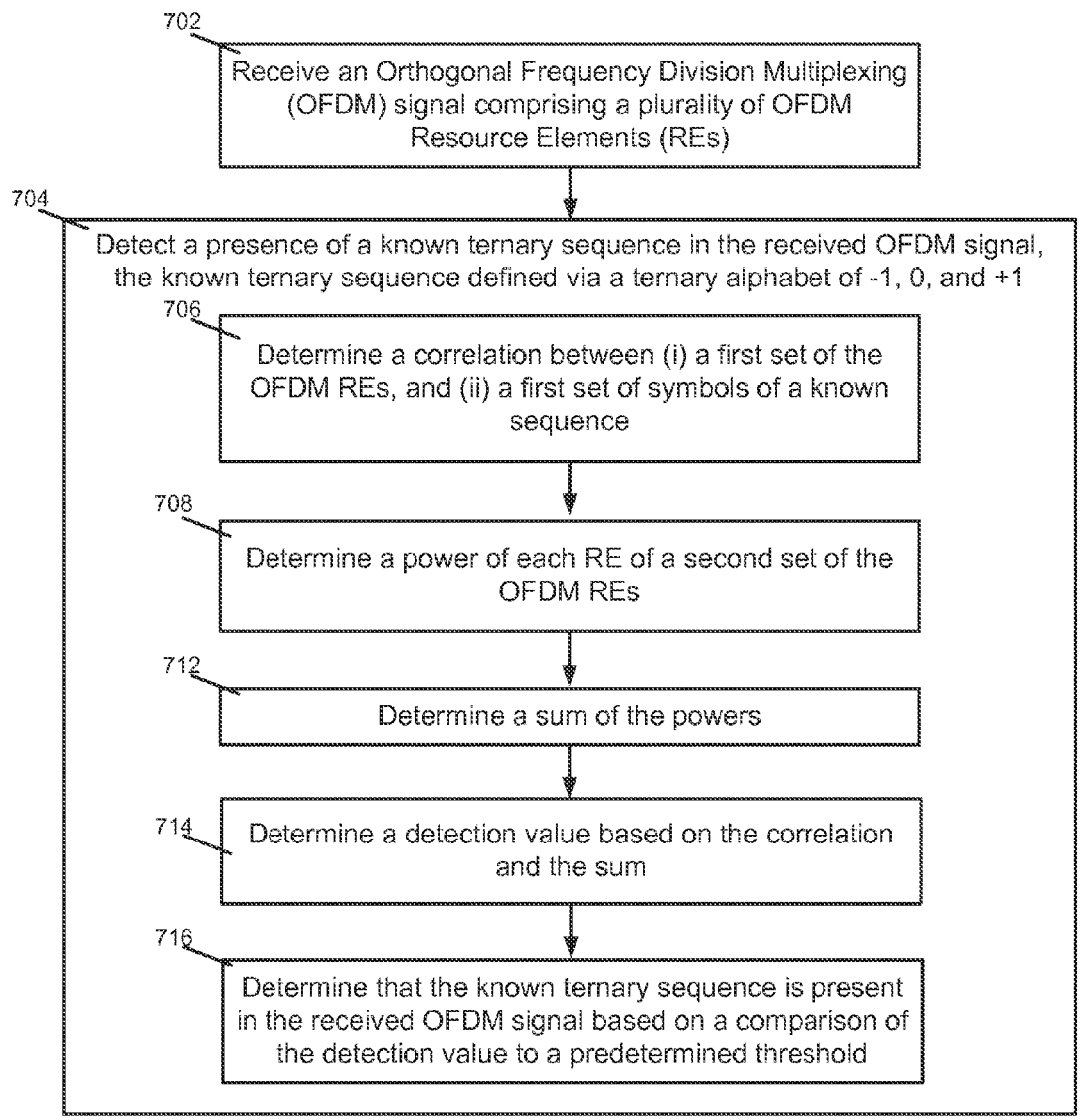
FIG. 7 is a flowchart illustrating an example method for detecting a ternary sequence.

FIG. 7 is a flowchart 700 illustrating an example method for detecting a ternary sequence. At 702, an OFDM signal comprising a plurality of OFDM REs is received. At 704, a presence of a known ternary sequence is detected in the received OFDM signal, where the known ternary sequence is defined via a ternary alphabet of −1, 0, and +1. Detecting the presence of the known ternary sequence in the received OFDM signal includes, at 706, determining a correlation between (i) a first set of the OFDM REs, and (ii) a first set of symbols of the known ternary sequence. The detecting also includes, at 708, determining a power of each RE of a second set of the OFDM REs. At 712, a sum of the powers is determined. At 714, a detection value is determined based on the correlation and the sum. At 716, it is determined that the known ternary sequence is present in the received OFDM signal based on a comparison of the detection value to a predetermined threshold.

This written description uses examples to disclose the invention, including the best mode, and also to enable a person skilled in the art to make and use the invention. The patentable scope of the invention includes other examples. Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein. Other implementations may also be used, however, such as firmware or even appropriately designed hardware configured to carry out the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

It should be understood that as used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Further, as used in the description herein and throughout the claims that follow, the meaning of "each" does not require "each and every" unless the context clearly dictates otherwise. Finally, as used in the description herein and throughout the claims that follow, the meanings of "and" and "or" include both the conjunctive and disjunctive and may be used interchangeably unless the context expressly dictates otherwise; the phrase "exclusive of" may be used to indicate situations where only the disjunctive meaning may apply.

It is claimed:

1. An apparatus comprising:
    a receiver configured to receive an Orthogonal Frequency Division Multiplexing (OFDM) signal comprising a plurality of OFDM Resource Elements (REs); and
    a processor coupled to the receiver, wherein the processor is configured to detect a presence of a known ternary sequence in the received OFDM signal, wherein the known ternary sequence is defined via a ternary alphabet of −1, 0, and +1, and wherein the processor is configured to detect the known ternary sequence by at least
        determining a correlation between (i) a first set of the OFDM REs, and (ii) a first set of symbols of the known ternary sequence,
        determining a power of each RE of a second set of the OFDM REs,
        determining a sum of the powers,
        determining a detection value based on the correlation and the sum, and
        determining that the known ternary sequence is present in the received OFDM signal based on a comparison of the detection value to a predetermined threshold.

2. The apparatus of claim 1, wherein the determining of the power of each RE of the second set comprises:
    determining an absolute value of each RE of the second set of the OFDM REs, and
    squaring each of the absolute values, wherein the sum is determined by summing the squared absolute values.

3. The apparatus of claim 1, wherein each OFDM RE has a time-frequency slot position that comprises a frequency interval of one OFDM sub-carrier and a time interval of one OFDM symbol.

4. The apparatus of claim 3, wherein:
    the first set of symbols of the known ternary sequence have values of −1 or +1, and a second set of symbols of the known ternary sequence have a value of 0,
    the first set of the OFDM REs have time-frequency slot positions that correspond to positions of the first set of symbols in the known ternary sequence, and
    the second set of the OFDM REs have time-frequency slot positions that correspond to positions of the second set of symbols in the known ternary sequence.

5. The apparatus of claim 1, wherein the determining of the correlation between the first set of the OFDM REs and the first set of symbols of the known ternary sequence comprises:
    multiplying each RE of the first set of the OFDM REs by a corresponding symbol of the first set of symbols to determine a product, the multiplied REs having time-frequency slot positions that correspond to positions of the first set of symbols in the known ternary sequence; and
    summing the products.

6. The apparatus of claim 5, wherein the determining of the correlation comprises:
    determining an absolute value of the sum of the products, wherein the OFDM signal contains unknown carrier phase rotations.

7. The apparatus of claim 5, wherein the determining of the correlation comprises:
    determining a real number portion of the sum of the products, wherein the OFDM signal does not contain unknown carrier phase rotations.

8. The apparatus of claim 1, wherein the detection value is based on $$O\_P = (2 * \text{Corr}) - \text{Sum},$$

where O_P is the detection value, Corr is the correlation, and Sum is the sum.

9. The apparatus of claim 1, wherein the ternary sequence in the received OFDM signal is a burst marker sequence, the burst marker sequence indicating a start of a data burst in the OFDM signal or indicating an end of a data burst in the OFDM signal.

10. The apparatus of claim 1, wherein the determining that the known ternary sequence is present in the received OFDM signal is based on a determination that the detection value is greater than or equal to the predetermined threshold.

11. An apparatus comprising:
a receiver configured to receive an Orthogonal Frequency Division Multiplexing (OFDM) signal comprising a plurality of OFDM Resource Elements (REs); and
a processor coupled to the receiver, wherein the processor is configured to detect a presence of a known ternary sequence in the received OFDM signal, wherein the known ternary sequence is defined via a ternary alphabet of −1, 0, and +1, and wherein the processor is configured to detect the known ternary sequence at least by
determining a correlation between (i) a first set of the OFDM REs, and (ii) a first set of symbols of the known ternary sequence, the first set of symbols having values of −1 or +1, and the first set of the OFDM REs having time-frequency slot positions that correspond to positions of the first set of symbols in the known ternary sequence,
determining an absolute value of each RE of a second set of the OFDM REs, the second set of the OFDM REs having time-frequency slot positions that correspond to positions of symbols in the known ternary sequence having a value of 0,
squaring each of the absolute values,
determining a sum of the squared absolute values,
scaling the determined correlation by a factor of two,
combining the scaled correlation and the sum to determine a detection value, and
determining that the known ternary sequence is present in the received OFDM signal based on a determination that the detection value is greater than or equal to a predetermined threshold.

12. A method comprising:
receiving an Orthogonal Frequency Division Multiplexing (OFDM) signal comprising a plurality of OFDM Resource Elements (REs); and
detecting a presence of a known ternary sequence in the received OFDM signal, wherein the known ternary sequence is defined via a ternary alphabet of −1, 0, and +1, and wherein detecting the presence of the known ternary sequence in the received OFDM signal includes
determining a correlation between (i) a first set of the OFDM REs, and (ii) a first set of symbols of the known ternary sequence,
determining a power of each RE of a second set of the OFDM REs,
determining a sum of the powers,
determining a detection value based on the correlation and the sum, and
determining that the known ternary sequence is present in the received OFDM signal based on a comparison of the detection value to a predetermined threshold.

13. The method of claim 12, wherein the determining of the power of each RE of the second set comprises:
determining an absolute value of each RE of the second set of the OFDM REs, and
squaring each of the absolute values, wherein the sum is determined by summing the squared absolute values.

14. The method of claim 12, wherein each OFDM RE has a time-frequency slot position that comprises a frequency interval of one OFDM sub-carrier and a time interval of one OFDM symbol.

15. The method of claim 14, wherein:
the first set of symbols of the known ternary sequence have values of −1 or +1, and a second set of symbols of the known ternary sequence have a value of 0,
the first set of the OFDM REs have time-frequency slot positions that correspond to positions of the first set of symbols in the known ternary sequence, and
the second set of the OFDM REs have time-frequency slot positions that correspond to positions of the second set of symbols in the known ternary sequence.

16. The method of claim 12, wherein the determining of the correlation between the first set of the OFDM REs and the first set of symbols of the known sequence comprises:
multiplying each RE of the first set of the OFDM REs by a corresponding symbol of the first set of symbols to determine a product, the multiplied REs having time-frequency slot positions that correspond to positions of the first set of symbols in the known ternary sequence; and
summing the products.

17. The method of claim 16, wherein the determining of the correlation comprises:
determining an absolute value of the sum of the products, wherein the OFDM signal contains unknown carrier phase rotations.

18. The method of claim 16, wherein the determining of the correlation comprises:
determining a real number portion of the sum of the products, wherein the OFDM signal does not contain unknown carrier phase rotations.

19. The method of claim 12, wherein the detection value is based on $O\_P=(2*Corr)-Sum,$ where $O\_P$ is the detection value, Corr is the correlation, and Sum is the sum.

20. The method of claim 12, wherein the ternary sequence in the received OFDM signal is a burst marker sequence, the burst marker sequence indicating a start of a data burst in the OFDM signal or indicating an end of a data burst in the OFDM signal.

21. The method of claim 12, wherein the determining that the known ternary sequence is present in the received OFDM signal is based on a determination that the detection value is greater than or equal to the predetermined threshold.

* * * * *